May 10, 1927.
A. GABRIEL
1,628,459
COMBINATION HOT WATER AND HOT AIR FURNACE
Filed Dec. 20, 1926    3 Sheets-Sheet 3
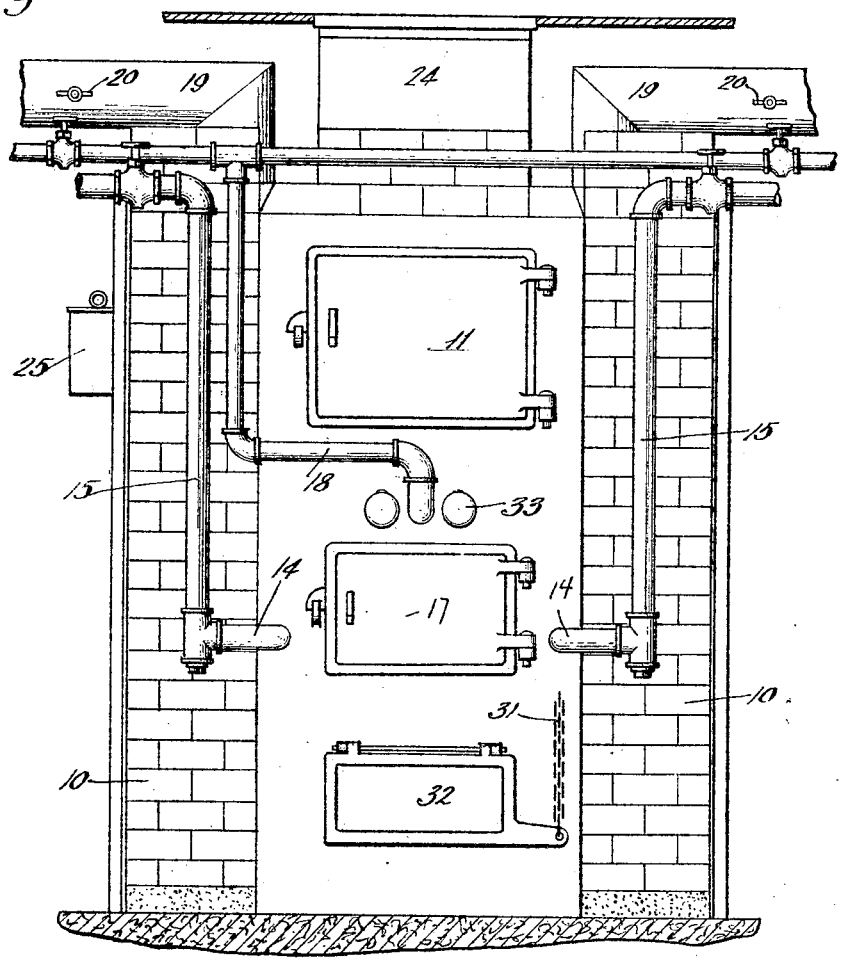
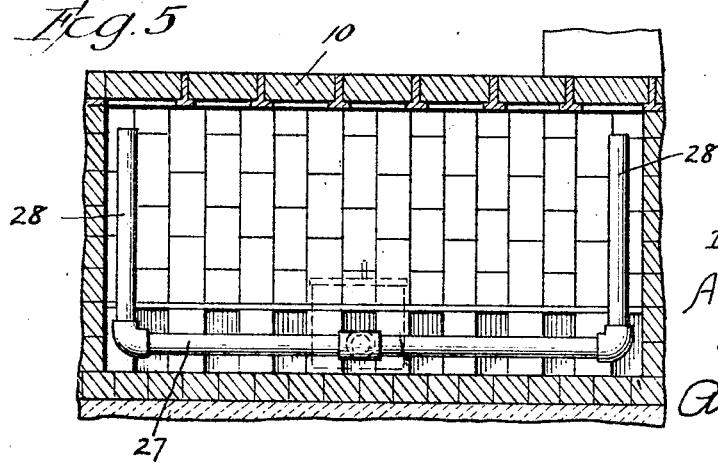
Inventor:
Anton Gabriel Patented May 10, 1927.

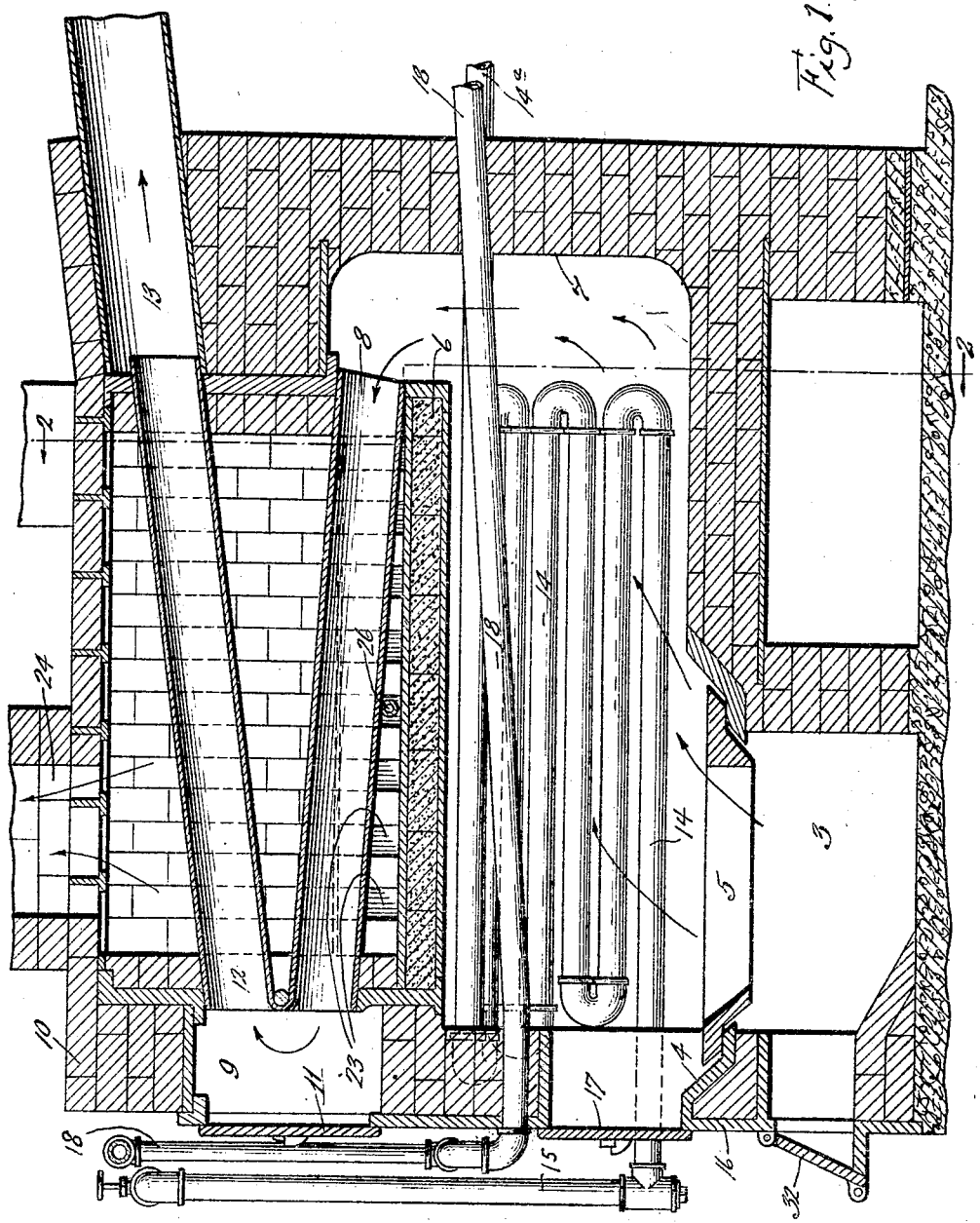

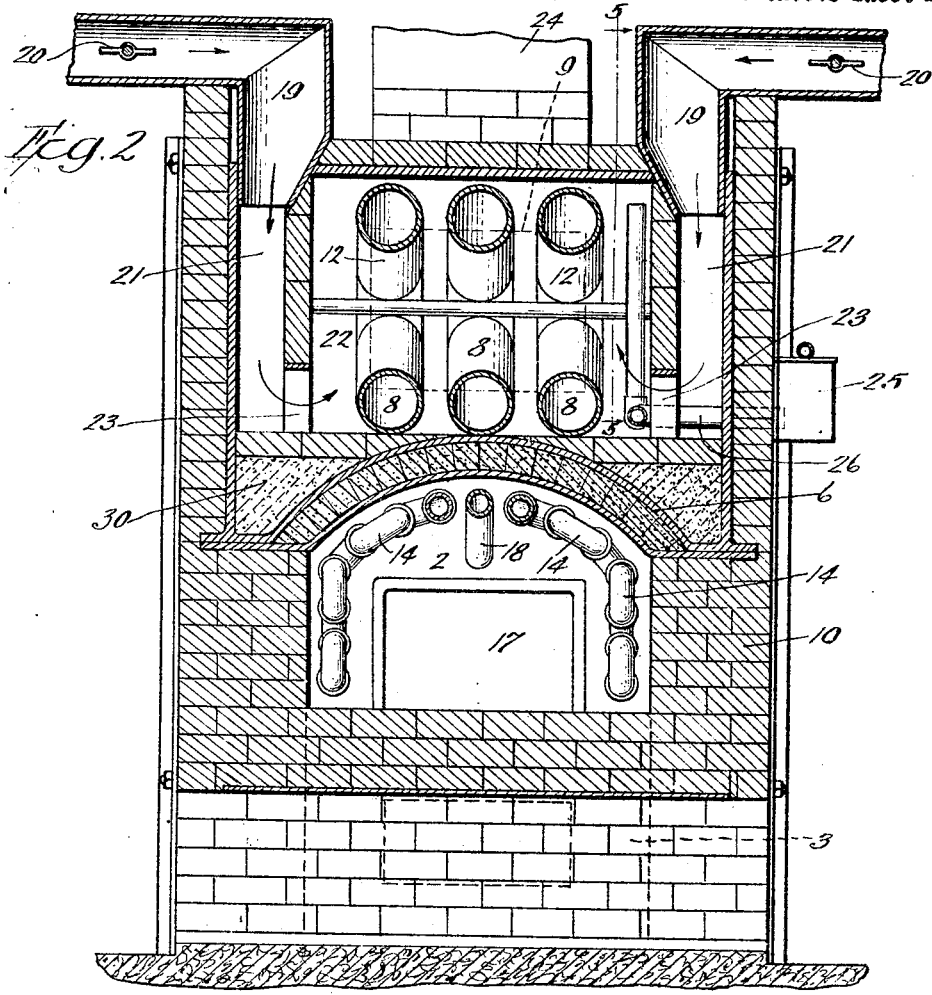

1,628,459

UNITED STATES PATENT OFFICE.

ANTON GABRIEL, OF EAST CHICAGO, INDIANA.

COMBINATION HOT-WATER AND HOT-AIR FURNACE.

Application filed December 20, 1926. Serial No. 155,826.

My invention relates to furnaces for use as part of the heating systems of buildings. Generally speaking, one of the main objects of my invention is that of providing an unusually efficient, durable and easily cleaned furnace designed for simultaneously heating the water for a hot water radiator system and heating air for a hot air heating system.

Furthermore, my invention provides a furnace for this two-fold purpose in which the pipes for the hot water are disposed in the hottest part of the furnace, while the air for the hot air heating system is warmed by the gases after they have passed the said hot water pipes; and in which water for consumption in sinks, wash stands and the like can also be heated by the hottest part of the furnace.

More particularly, my invention provides a furnace in which the water pipes are effectively subjected to the heat in the combustion chamber without being in the way of the fueling, and in which the products of combustion traverse relatively long smoke tubes in passing from the combustion chamber to the chimney, so as to have a prolonged effect on air in a hot air chamber in which these smoke tubes are disposed. It also provides a construction for this purpose in which the smoke tubes are inclined to enhance the draft through them and are arranged to permit soot easily to be raked out of them.

In some further aspects, my invention provides a simple and effective arrangement for moistening the air within the hot air chamber so as to humidify the air supplied to the hot air heating system, and provides a furnace construction which will subject the hot air chamber to heat for a considerable period of time after the fire has died down. Moreover, my invention provides a furnace for such composite purposes designed so that it can be built in a compact form, so that its heating effect can readily be proportioned to the relative amounts of hot water heat and hot air heat suitable for residences as well as other types of buildings, and so as to supply running hot water also.

Still further and also more detailed objects will appear from the following specification and from the accompanying drawings, in which—

Fig. 1 is a central, vertical and longitudinal section through a furnace embodying my invention.

Fig. 2 is a vertical section taken through Fig. 1 along the line 2—2 of that figure, with the water-moistening pipe omitted.

Fig. 3 is a front elevation of the furnace.

Fig. 4 is a reduced side elevation of one of the two coils for the hot water heating system.

Fig. 5 is a fragmentary longitudinal and vertical section through the air-heating chamber of my combination furnace, showing the arrangement of one of the air-moistening pipes.

In the illustrated embodiment of my invention, the bottom 1 of the combustion chamber 2 is connected near its forward end to the ashpit 3 by an opening which is bordered by a grate-supporting frame 4, and a grate 5 is detachably seated on this frame. The arched top 6 of the combustion chamber terminates forwardly of the rear wall 7 of this chamber, and the part of the combustion chamber extending rearwardly of the arched top 6 is of an increased height so as to afford a connection between the rear end of this chamber and the rear ends of the lower smoke ducts 8. These smoke ducts slope upwards forwardly, as shown in Fig. 1 and open into a clean-out chamber 9 which is built into the front wall 10 of the furnace and which is closed at its front by a door 11. Upper smoke tubes 12 extend rearwardly from this clean-out chamber and open into a flue pipe 13 which leads to the usual smoke stack, the latter not being shown in the drawings. These upper smoke tubes slope upward rearwardly and the flue pipe 13 preferably also slopes upward at about the same angle as these smoke tubes, so that soot can readily be raked out of both by a tool inserted through the clean-out chamber 9, while soot in the lower smoke ducts 8 can similarly be raked down into the rear end of the combustion chamber.

Extending through the combustion chamber along the opposite sides and top of this chamber are two sets of hot water pipes 14, each of which sets leads from an inlet pipe 15 in front of the furnace (Fig. 3) and terminates in an outlet pipe portion 14$^a$ extending through the rear wall 7 of the furnace. The hot water piping at each side of the combustion chamber is desirably built as a connected coil, such as the left-hand one shown separately in Fig. 4, with the inlet end 14$^b$ at the bottom and the outlet portion 14$^a$ at the top. With each half of the hot water piping thus constructed as a unitary coil, each such coil can easily be inserted as a unit into the combustion chamber before attaching the frontal frame 16 in which the fire box door 17 is mounted.

To meet the usual need of a supply of running hot water for wash basins, sinks and the like, I also provide a separate water pipe 18 which is desirably disposed between the two hot water coils 17 and which may consist of a single pipe sloping upward from the front to the rear of the furnace, as shown in Fig. 1.

Since both the hot water coils 14 (which are connected in the usual manner to suitably distributed radiators) and the hot water supply pipe 18 are disposed right in the combustion chamber and are subjected to the heat of the flames and hot gases for substantially the entire length of these pipes, I secure a highly effective heating of the water in the said pipes. When I utilize a large share of the heat remaining in the combustion gases by circulating air around the smoke ducts 8 and 12. For the latter purpose, my drawings show a pair of air inlet pipes 19, each controlled by a damper 20 and each leading downward to a passage 21 at one side of the air heating chamber 22 in which the said smoke ducts 8 and 12 are disposed. The inlet passages 21 preferably extend down close to the rear end of the lower smoke ducts 8 so as to admit the cool air near the rear end of the air heating chamber or adjacent to the hottest parts of the lower smoke ducts, but the air inlet passage may extend considerably forward so as to be connected to the air heating chamber by a large number of air passages 23 as shown in Fig. 1. Then I provide at least one hot air outlet for the air heating chamber 22, such as the outlet 24 of Figs. 1 and 2, which is preferably disposed near the forward end of the said chamber and which is connected in the usual manner to hot air registers in the building which is to be heated by my furnace.

To reduce the amount of hot air heating required for these registers, I preferably also humidify the air while heating it in the chamber 22. For that purpose, I am showing a water tank 25 mounted on the exterior of one side of my furnace and connected by an inlet pipe 26 to the middle of a horizontal pipe 27 which extends horizontally along the bottom of the air heating chamber 22. Each end of the horizontal pipe 27 is connected to a riser pipe 28 which terminates below the top of the said chamber so that the water vaporized in this piping by the heat in the chamber will be distributed through the hot air by the draft in this chamber.

By suitably proportioning the various parts of my furnace, I can readily adapt this to some differences in the proportion of the heating effected respectively through hot water radiators and through hot air registers, my drawings being made from a furnace which I have found quite efficient in supplying about two-thirds of the heat for a building through hot water radiators and the remaining one-third by means of hot air registers. Moreover, I have found that with the arrangement here described, the heating effect will be maintained equally by the hot water radiators and by the hot air registers when the condition of the fire varies, for these reasons:

As long as a hot fire is maintained, the coils 14 are subjected to it and the smoke tubes are correspondingly heated so as to warm the air for the registers. When the fire is banked, the high specific heat of the water in the radiators causes these radiators to remain warm for a considerable length of time, thus making them much more effective with a low or banked fire than steam radiators would be. At the same time, the walls of both the combustion chamber and the air heating chamber also gradually give out the heat which was stored in them, so that the walls of the air heating chamber directly warm air in it for a considerable time and the walls of the combustion chamber have the same effect by giving out heat which warms the air through the smoke tubes. In practice, I desirably enhance this heat-storing effect of my furnace walls by using a suitable filling, such as a mixture of pulverized sand and glass (shown at 30 in Fig. 2) for portions of them and particularly for the wall between the combustion chamber and the air heating chamber. Owing to the effective use of such heat storing and to my utilizing a large proportion of the heat which is sent up the smoke stack by the furnaces or boilers, usually employed for either steam or hot water radiators, my combination hot water and hot air furnace effects a large saving in fuel over that which would be required for the same amount of heating by the separate hot water, steam, or hot air furnaces now in use. Moreover, since my furnace also supplies running hot water for the usual needs, it affords a single and easily fired unit for furnishing this hot water while also economically heating buildings of widely varying types.

However, no unusual attendance or special skill is required to secure this, as even a novice can quickly learn how to care for my furnace. Moreover, I may provide automatic control attachments, such as a draft regulator connected by a chain 31 to the ash-pit door 32 of Fig. 3, it being unnecessary to picture or describe any such regulators as their construction and operation is so widely known. I also desirably provide auxiliary air inlets leading to the upper part of the combustion chamber and controlled by pivoted air doors 33, so as to furnish the added air needed for burning fresh fuel to avoid smoke.

However, I do not wish to be limited to these auxiliary provisions, nor to the details of the construction and arrangement as above described, since many changes might be made without departing either from the spirit of my invention or from the appended claims. For example, by removing the grate 5 and supporting an oil burner in the ash-pit, my furnace is equally suitable for use with oil as fuel.

I claim as my invention:

1. A combination hot water and hot air furnace, comprising a firebox, a hot air chamber disposed above the fire box, a smoke duct extending from the rear end of the fire box through the hot air chamber, and water piping extending through the fire box, the hot air chamber being separated from the fire box by a partition having a filling of heat-storing material.

2. A combination hot water and hot air furnace, comprising a fire box, a hot air chamber disposed above the fire box, a chimney behind the hot air chamber, a clean-out chamber in front of the hot air chamber, a smoke pipe leading from the rear end of the fire box to the clean-out chamber and sloping upward forwardly, a second smoke pipe leading from the clean-out chamber to the chimney and sloping rearwardly upward, and water piping extending through the hot air chamber at opposite sides of the smoke pipes.

3. A combination hot water and hot air furnace, comprising a fire box, a hot air chamber disposed above the firebox, and terminating forwardly of the rear end of the fire box, the fire box having its rear portion extending upwardly behind the lower part of the hot air chamber, a smoke duct sloping upwardly forward and extending within the hot air chamber from the rear portion of the fire box throughout the length of the hot air chamber, a second smoke duct disposed above the first named smoke duct and connected at its forward end to the latter, the second smoke duct sloping upward rearwardly and extending for the full length of the hot air chamber, and water piping extending through the fire box.

4. A combination hot water and hot air furnace, comprising a firebox, a hot air chamber disposed above the firebox, a smoke duct extending from the rear end of the firebox through the hot air chamber; and water piping extending through the firebox; the said piping comprising separate coil units each extending along one side of the fire box and along the adjacent lateral half of the top of the firebox.

5. A combination hot water and hot air furnace, comprising a firebox, a hot air chamber disposed above the firebox, a smoke duct extending from the rear end of the firebox through the hot air chamber; and water piping extending through the firebox; the said piping comprising separate coil units each extending along one side of the firebox and along the adjacent lateral half of the top of the firebox, and a separate water pipe extending longitudinally of the furnace through the upper part of the firebox between the said coil units and sloping upwardly from one end of the firebox to the other.

6. A furnace comprising a fire box, a hot air chamber of corresponding width disposed above the fire box, air inlet ducts disposed at opposite sides of the hot air chamber and connected to the air chamber near its bottom, and an air outlet at the top of the air chamber.

7. A furnace comprising a fire box having an arched top wall, a hot air chamber having a flat bottom above and partly spaced from the said arched wall, and a filling of heat-storing material between the said walls.

8. A furnace as per claim 7, in which both of the said walls extend laterally beyond the fire box, air inlet ducts disposed at opposite sides of the hot air chamber above parts of the said filling, inlet connections between the bottoms of the said ducts and the hot air chamber, and an air outlet duct leading from the top of the hot air chamber.

9. A furnace comprising a fire box, a hot air chamber of corresponding width disposed above the fire box, air inlet ducts disposed at opposite sides of the hot air chamber and connected to the air chamber near its bottom, and an air outlet at the top of the air chamber, and air moistening means including piping extending through one of the air inlet ducts and opening upwardly within the hot air chamber.

10. A furnace as per claim 9, in which the said piping includes a pipe portion extending longitudinally of the hot air chamber within the lower part of that chamber and risers pipe portions respectively at the ends of the aforesaid pipe portion.

Signed at Chicago, Illinois, December 4th, 1926.

ANTON GABRIEL.